Figure 1:
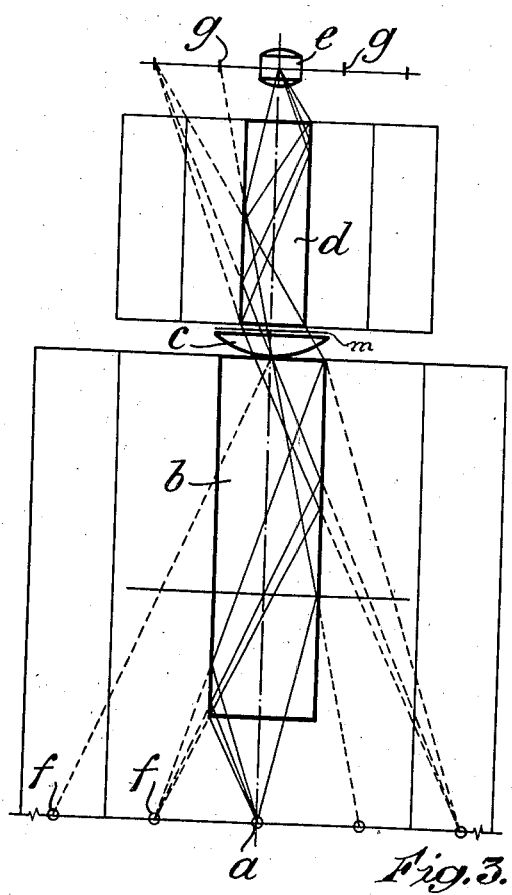

March 16, 1926.                F. TWYMAN                1,577,388
                            PROJECTION APPARATUS
                            Filed May 19, 1923

INVENTOR
FRANK TWYMAN,
By his Attorneys,
Baldwin Wight.

UNITED STATES PATENT OFFICE.

FRANK TWYMAN, OF LONDON, ENGLAND, ASSIGNOR TO ADAM HILGER, LIMITED, OF LONDON, ENGLAND.

PROJECTION APPARATUS.

Application filed May 19, 1923. Serial No. 640,199.

*To all whom it may concern:*

Be it known that I, FRANK TWYMAN, a subject of the King of Great Britain, residing at 75A Camden Road, London, England, have invented new and useful Improvements in Projection Apparatus, of which the following is a specification.

This invention relates to projection apparatus, particularly to projection kaleidoscopes which are sometimes termed "decoroscopes." In such apparatus the central image, that is the direct image of the object, is successfully illuminated but the illumination of the other images, namely the virtual images of the object, is very poor.

It has been suggested to interpose a plate of ground glass near the condensing lens; by this means the brightness of the outlying parts of the pattern is improved at the expense of the brightness of the central part. The total loss of light however is so great as to preclude a successful projection of the image except for a very short distance, say 8 feet.

The object of this invention is to obtain the good illumination of both the central and outlying parts of the pattern when the picture is projected a considerable distance, say 100 feet.

In apparatus with which the present invention is concerned a condensing lens is placed in front of the object to be projected which may be a film or an object box as used in kaleidoscopes and at the back of the film box is a prism whose cross section is a regular polygon or mirrors which are coincident with the sides of such a geometrical prism. Light issuing from an electric lamp or other source passes through the condensing lens and the film or box to the prism or mirrors and thence to a projecting lens. By this arrangement a picture is projected of the direct object and of the virtual images of the object, the word "object" including any line drawing, coloured transparency, pieces of glass or the like, placed within the effective space at the object end of the kaleidoscope prism, and of which it is desired to form a repeated pattern.

According to this invention I provide means for efficiently illuminating the pictures on the screen, not only of the direct object, but of the virtual images of that object. The efficient illumination of the picture of the direct object is effected by means of the condenser as in already existing apparatus. The efficient illumination of the picture of the virtual images is ensured by providing that rays of illuminating light fall upon the condenser at angles, such that the object is illuminated by rays in all the directions which light from it must take in order that the pictures of the virtual images may be illuminated by the projecting lens on the screen.

This may be attained by an arrangement of optical elements which produce virtual images of the light source, the correct position for the said virtual images being at the foci of the condensing lens conjugate with the virtual images of the centre of the projecting lens formed by the kaleidoscope prism or mirror system. Or I may provide other sources of light located at the same conjugate foci.

In one embodiment of the invention a similar prism, or similarly arranged mirrors, to those above referred to is placed between the source of light and the condensing lens. When there is a space between the first and second prisms (or mirrors) the second mentioned prism (or mirrors) is larger in size than that first mentioned and it is found by calculation that when the cross section of the prism is a square or that when the mirrors are arranged at right angles to each other in the form of a square the dimensions of the prism (or mirrors) are ascertained from the following formulæ:

$l$ = length of projection prism or mirrors;
$l_2$ = the same for light source whose image has width $d_2$;
$w$ = width of same;
$L$ = length of illuminating prism or mirrors from a point of light source;
$L_2$ = the same for a light source of width $d$;
$W$ = the width of the illuminating prism or mirrors;
$b$ = the condenser space, that is the space between the two prisms; this space in order to reduce the size of the illuminating prism or mirrors should be as small as possible;
$\theta$ = the angular field;
$n$ = the number of images, namely the direct image and the virtual images of the object.

$S$ = the distance of the light source from the first principal point of the condenser.

When $b = 0$ then $w = W$.

In other cases:

$$l = (n-1)\frac{w}{2\tan\theta}$$

$$l_2 = \frac{l}{1 - \frac{d_2}{nw}}$$

$$W = w\left\{1 + \frac{b}{l}(n-1)\right\}$$

$$S = \frac{W}{w}\left[\left\{l\left(1 + \frac{1}{(n-1)}\right)\right\} + b\right]$$

$$L = S\left[1 - \frac{1}{(n-1) + \frac{w}{W}\left\{1 - \frac{b(n-2)}{l\left(1 + \frac{1}{(n-1)}\right)}\right\}}\right]$$

$$L_2 = S\left[1 - \frac{1}{(n-1) + \frac{w}{W}\left\{1 - \frac{b(n-2)}{l\left(1 + \frac{1}{n-1}\right)}\right\} + \frac{d}{W}}\right]$$

The particulars when prisms of other cross sections are used can be similarly calculated.

In the existing projecting kaleidoscopes referred to there is no sharply defined limit to the picture. It is therefore either impossible to confine the picture to the limits of the screen or if the whole picture is small enough to appear on the screen the limiting margin of the entire picture is badly defined whereby a displeasing effect is produced on the eye.

In order to overcome this objection I, according to this invention, limit the picture to a definite size and shape by inserting a second projecting lens and a diaphragm having in it an aperture between the end of the projecting prism or mirrors and the usual projecting lens. The second projecting lens forms an image on the diaphragm of any desired size and the light passes through the aperture to the ordinary projecting lens which projects the limited picture on to the screen.

Figure 2:
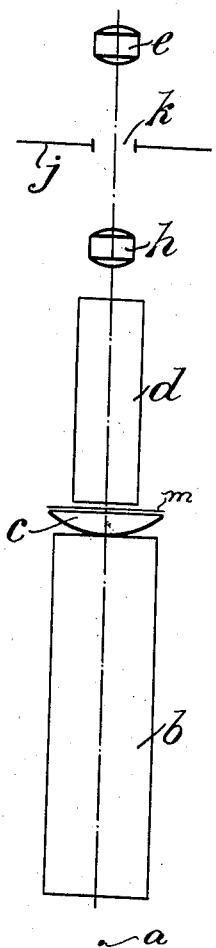

In the accompanying drawing, Figure 1 shows diagrammatically a projection apparatus made in accordance with this invention and Figure 2 shows a modification of the same.

Figure 3:
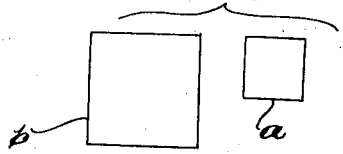

Figure 3 shows cross sections of the lenses $b$ and $d$.

$a$ is a light source from which light is admitted to a prism $b$ whose cross section is a square from which the light issues to a condensing lens $c$ to another similar prism $d$ of smaller size than $b$, a space being left between the condensing lens $c$ and the prism $d$ for the interposition of the object such as film $m$ to be projected and $e$ is a projecting lens by which the image of the object is projected on to a screen. $f$ are the virtual images of the light source $a$ situated at the foci of the condensing lens $c$ conjugate with the virtual images $g$ on the centre of the projecting lens $c$ formed by the prism $d$.

In the modification shown in Figure 2 another projecting lens $h$ and a screen $j$ having an aperture $k$ is inserted between the prism $d$ and the projecting lens $e$.

In the following claims the term "prism" includes mirrors coincident with the side of a similar geometrical prism.

What I claim is:—

1. In projection apparatus, a projecting lens, a prism whose cross section is a regular polygon, a condenser and a light source, all of said parts being arranged along an optical axis and optical elements which produce virtual images of the light source at the foci of the condensing lens, conjugate with the virtual images of the center of the projecting lens formed by the prism.

2. In projection apparatus, a projecting lens, a prism whose cross section is a regular parallelogram, a condenser and a light source, all of said parts being arranged along an optical axis and a prism similar to the other located between the light source and the condenser.

3. In projection apparatus, a projecting lens, a prism whose cross section is a regular parallelogram, a condenser and a light source, all of said parts being arranged along an optical axis and a prism similar to but larger than the other prism located between the light source and the condenser so that a space is left between the prisms.

4. In projection apparatus, two projecting lenses and a screen having an aperture between the projecting lenses, a prism whose cross section is a regular polygon, a condenser and a light source, all of said parts being arranged along an optical axis and producing virtual images of the objects to be projected and means for illuminating the images on the screen corresponding to the virtual images formed by the prism.

5. In projection apparatus, two projecting lenses and a scale having an aperture between the two projecting lenses, a prism whose cross section is a regular polygon, a condenser and a light source, all of said parts being arranged along an optical axis and optical elements which produce virtual images of the light source at the foci of the condensing lens conjugate with the virtual images of the center of the projecting lens formed by the prism.

6. In projection apparatus, two projecting lenses and a screen having an aperture between the projecting lenses, a prism whose cross section is a regular parallelogram, a condenser and a light source, all of said parts being arranged along an optical axis and a prism similar to the other located between the light source and the condenser.

7. In projection apparatus, two projecting lenses and a screen having an aperture between the two projecting lenses, a prism whose cross section is a regular parallelogram, a condenser and a light source, all of said parts being arranged along an optical axis and a prism similar to but larger than the other prism located between the light source and the condenser so that a space is left between the prisms.

In testimony that I claim the foregoing as my invention I have signed my name this eighth day of May 1923.

FRANK TWYMAN.